US008712420B2

(12) United States Patent  (10) Patent No.: US 8,712,420 B2
Marti et al.  (45) Date of Patent: Apr. 29, 2014

(54) GENERATING A NETWORK MAP

(75) Inventors: Urs-Viktor Marti, Münchenbuchsee (CH); Thomas Zasowski, Zürich (CH)

(73) Assignee: Swisscom AG, Bern (CH)

( * ) Notice: Subject to any disclaimer, the term of this patent is extended or adjusted under 35 U.S.C. 154(b) by 22 days.

(21) Appl. No.: 13/337,873

(22) Filed: Dec. 27, 2011

(65) Prior Publication Data

US 2012/0184279 A1  Jul. 19, 2012

(30) Foreign Application Priority Data

Jan. 17, 2011 (EP) .................................... 11151166

(51) Int. Cl.
*H04W 64/00* (2009.01)
(52) U.S. Cl.
USPC ............ 455/446; 455/501; 455/509; 455/561
(58) Field of Classification Search
None
See application file for complete search history.

(56) References Cited

U.S. PATENT DOCUMENTS 5,875,186 A   2/1999 Belanger et al.
7,948,914 B2 *  5/2011 Azimi et al. .................. 370/252
2006/0153246 A1 *  7/2006 Aoki et al. .................... 370/508
2010/0022263 A1 *  1/2010 Stamoulis et al. ............ 455/501
2010/0278158 A1  11/2010 Lee et al.

FOREIGN PATENT DOCUMENTS

EP  2237487  10/2010

OTHER PUBLICATIONS

European Search Report, Application No. 11151166.3-01525, dated Jul. 7, 2011.

* cited by examiner

*Primary Examiner* — Kashif Siddiqui
(74) *Attorney, Agent, or Firm* — McAndrews, Held & Malloy, Ltd.

(57) ABSTRACT

Aspects of the present invention relate to a method, and various systems operable or arranged to implement that method, of generating a network map illustrating availability of network access technologies in various locations of the network. The method may comprise the following steps: (a) sending, by a first network unit, the location of which is identified by a first identifier, first data to a second network unit, the location of which is identified by a second identifier, whereby the first data is sent using at least two different network access technologies and is sent to at least two different possible locations for the second network unit; (b) receiving by the first network unit from the second network unit, first measurement data relating to the sent first data; and (c) generating the network map based on the measurement data, the first identifier and the second identifier.

27 Claims, 5 Drawing Sheets

GENERATING A NETWORK MAP

CLAIM OF PRIORITY AND CROSS-REFERENCE TO RELATED APPLICATIONS/INCORPORATION BY REFERENCE

Pursuant to 35 U.S.C. §119, this patent application claims the filing date benefit of and right of priority to European Application No. 11151166.3, which was filed on Jan. 17, 2011.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

The present invention relates to networking. More specifically, certain embodiments of the invention relate to method for of generating a network map, such as a home network map. The present invention likewise relates to corresponding communication network units, to a communication system and to a computer program product being operable to and/or arranged to implement the method.

BACKGROUND OF THE INVENTION

A home network, also known as a home area network, is a residential local area network. It is used for communication between devices typically deployed in a home. The devices involved are usually a small number of personal computers and accessories, such as printers, routers, switches and mobile computing devices. In most home networks an important function is the sharing of Internet access, often a broadband service through a cable television, fibre or digital subscriber line (DSL) provider. Additionally, a home server may also be added for increased functionality.

One common way of creating a home network is by creating a wireless local area network (WLAN), which can be based on any IEEE 802.11 specification, Wireless Gigabit Alliance (WiGig) specifications, high speed packet access (HSPA), HSPA evolution, Worldwide Interoperability for Microwave Access (WiMAX), 3GPP long term evolution (LTE), etc. A home network can also include a combination of different network access technologies. Femtocells can be advantageously used in the design of wireless home networks. A wireless home network can be used to connect electronic devices to each other, to the Internet, and/or to wired networks which use Ethernet technology, for instance.

As an alternative to wireless technologies, the existing home wiring can be used to create a home network. The Internet access can be achieved over the existing wiring between the home and an access provider. The connectivity for the Internet access can be based on, for example, coaxial (coax) cables, phone wires, fibres or power lines to allow devices to transfer information. The ITU-T G.hn and IEEE Power Line Standard, which provide high-speed (up to 1 Gbit/s) local area networking over existing home wiring, are examples of home networking technologies designed specifically for Internet protocol television (IPTV) delivery. The user can install a wired home network by using special wall plugs which can support different access technologies, such as Power Line Standard, polymer optical fibre or Ethernet. With the installation of a home network, the network can be accessed by simply plugging a computer into a wall socket.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for generating network maps, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the invention will become apparent from the following description of non-limiting exemplary embodiments, with reference to the appended drawings, in which.

DETAILED DESCRIPTION OF THE INVENTION

Certain embodiments of the present invention may be found in a method and system for generating network maps, as described in the following in more detail with reference to the attached figures.

In current home networks, it is difficult to predict the performance of home networking devices such as power line communication (PLC) modems or WLAN devices. For PLC, it mainly depends on the power line installation, i.e. cabling; and for WLAN, distance and number of walls may determine the throughput and coverage. Aspects of the present invention enable more reliable determination of the performance of a home network and more specifically locations where certain home networking devices could be advantageously placed in order to optimise their operation. Additionally, aspects of the present invention enable, for a given location, determination of which access technology or technologies would be optimal or otherwise desirable. The above considerations also apply to business and neighbourhood networks and are not limited to the above mentioned communication technologies and standards.

An embodiment of the present invention will be described in the following in more detail with reference to the attached figures. This embodiment will be described in the context of a home network, but it is to be noted that the teachings of the present invention are not limited to the home networks, but are also applicable in e.g. business and neighbourhood networks. Aspects of the present invention enable automatically generating, based on channel properties and/or features, a network map illustrating availability and/or properties of network access technologies in various locations of the network. Furthermore, aspects of the present invention can consider several wireless and wired technologies simultaneously. Based on the generated map, a recommendation can be given for the optimum positions for home networking equipment with specific technology to achieve the best possible performance. Additionally the best suited technology can be recommended, assuming that the position is a more important concern.

Figure 1:
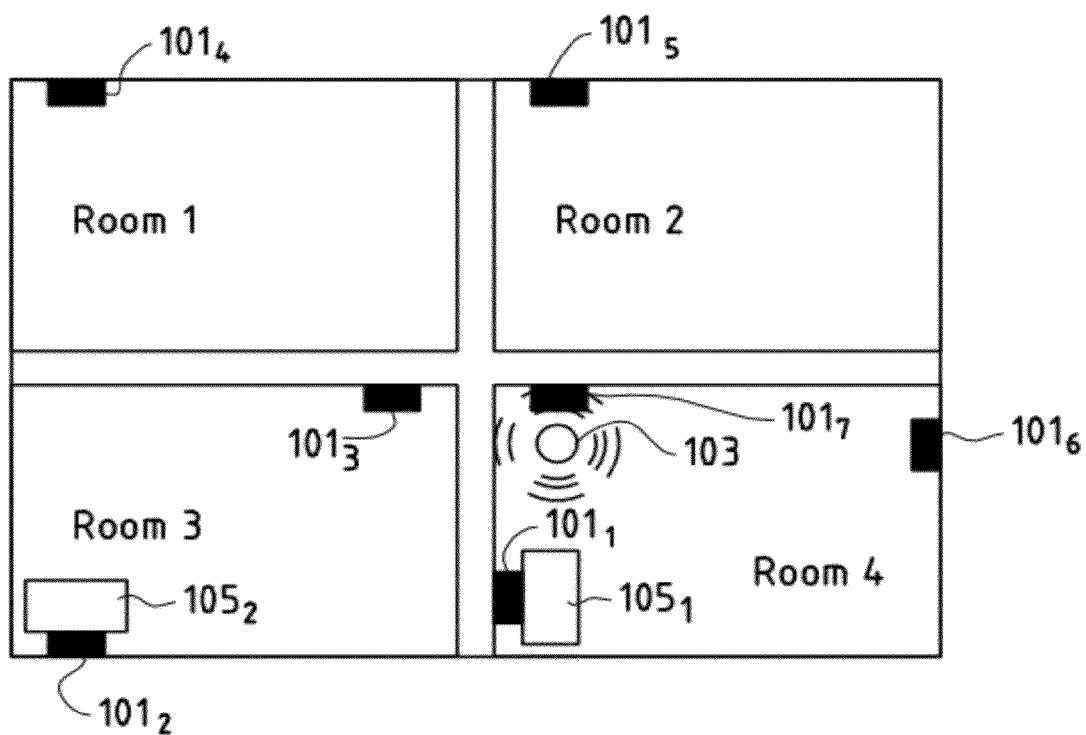
FIG. 1 is a simplified exemplary layout of a home for which a home network map can be determined, in accordance with an embodiment of the present invention.

FIG. 1 is a simplified exemplary layout of a home for which a home network map can be determined, in accordance with an embodiment of the present invention. In the exemplary setup shown in FIG. 1, the home shown therein may comprise a four-room apartment, and the home network may be spread over the four rooms, namely room 1, room 2, room 3 and room 4.

In FIG. 1 there are shown 7 mains sockets or power line sockets $101_1$-$101_7$. The sockets $101_1$-$101_7$ may be in different phases. There can be, for example, three power line phases. For example, sockets $101_1$, $101_2$, $101_6$ and $101_7$ may be in phase 1, whereas the sockets $101_3$, $101_4$ and $101_5$ may be in phase 2.

In room 1 there is also shown a residential WLAN transmitter 103. The WLAN transmitter 103 may comprise suitable logic, circuitry, interfaces, and/or code that may be operable to implement various aspects of the present invention. In this regard, the WLAN transmitter 103 may be operable to create and/or arranged for creating a wireless access network for peripheral devices, such as laptop computers or printers (not shown).

In FIG. 1 there are also shown first and second home networking units $105_1$ and $105_2$. The home networking units 105 may comprise suitable logic, circuitry, interfaces, and/or code that may be operable to implement various aspects of the present invention. In this regard, the home networking units 105 may be operable to automatically create and/or arranged for automatically creating the home network map, as is described later in more detail. The home networking units 105 may comprise personal computers and laptops, tablets, televisions (e.g. HDTV), printers, and other like devices.

In operation, a networking map may be generated automatically in the home shown in FIG. 1, using various networking elements in the home for example. The automatically generated map of the house installation may help in determining suitable setups for placing the home networking equipment. This can be used in particular by employees from field services to support customers with their home installation, and/or by customers themselves. Additionally, the generated map may enable customers to get a rough overview of the best suited technology for a given position, as well as an overview of wired line installations. The home networking equipment can use any combination of wireless technology, e.g. WLAN, WiGig, HSPA, LTE, or wired technology, e.g. power line, optical fibre, Ethernet, Coax, media for transmission.

The optimum network access technology at a given position can be determined by placing one unit, e.g., home networking unit $105_1$, at a measurement point, e.g., a wall connection point, and another unit, e.g., home networking unit $105_2$, at the remaining positions of interest, one after the other. Each of the positions will get an identity (ID). This ID may be given by the home networking unit 105, as will be explained later in more detail. Based on physical parameters, such as signal strength, and a localisation measurement (e.g. time-of-arrival or time-difference-of-arrival), a distance measure between two home networking units $105_1$, $105_2$, as well as the achievable data rates are determined. Additionally, dependencies of different sockets (e.g. connected to different phases) can be determined in the case of wired technologies. The results can be determined within one measurement step for all different media supported by the home networking units 105. The results can be plotted into a map where the layout of the home installation is shown schematically. On the map, optimal technologies for a given position as well as optimal positions for a given technology are recommended based on the physical characteristics of the different media's channels.

To do the measurements, at least two home networking units $105_1$, $105_2$ are needed, which possibly support multiple technologies. One unit, e.g. home networking unit $105_1$, may be used as a reference (base) station, and it is placed at a reference position, such as close to a home gateway that may be the access point to the external communication network, which can operate by using Internet protocol, for example. In FIG. 1, the first home networking unit $105_1$, acting as a reference station, may be plugged into, for example, the socket $101_1$, which may be close to the home gateway. A second unit, e.g., home networking unit $105_2$ (outstation, measurement point), may function as a measurement unit in accordance with an exemplary embodiment of the present invention, and may be afterwards placed at all other positions of interest in the house or apartment. At each measurement point, a non-ambiguous ID is given to this measurement point for later evaluation. The two units 105 involved are made aware of each other's IDs for combination purposes. Thus, the units 105 may exchange the IDs if/when they have connectivity. If there is no connectivity between the two units 105, then the measurement will fail and repositioning of at least one of the units 105 is necessary. Each measurement should have its own identifier. This can be done by exchanging the identifiers between both units. In an alternative solution, each measurement gets a unique identifier when it is stored in an additional data storing element (not shown), which may be in the home network or external to it, being accessible via the Internet for example. The storing of the measurement data is explained later in more detail.

When performing measurements, the second unit $105_2$ may be moved from a location to a new location until no or only a very weak signal can be received. Then the first unit $105_1$ is moved to a new, not yet used location, where there is a high probability that it can establish a connection to the second unit $105_2$. The second unit $105_2$ is not moved in case of a connectivity failure. If power line is used, it is possible that both units 105 are now in a different phase than before. It is to be noted that, depending on the implementation details, also the reference station $105_1$ can operate as a measurement station, as becomes clear from the following description.

The measurement is started, e.g., by pressing a button on the second home networking unit $105_2$. During the measurement, different physical and statistical characteristics and features are measured and stored between the first home networking unit $105_1$ (base) and the second home networking unit $105_2$ (measurement point). Measurements on the channel between these two units are at least one of the following: attenuation, signal-to-noise ratio, signal-to-interference ratio, throughput, distance, round-trip time, data receiving statistics, bit rate sweep statistics, packet size sweep statistics, data loss statistics, and retransmission information. These measurements, which are enabled by sending any data between two home networking units, are explained next in more detail.

The measurements can be done in both directions. For example, first the link from the first home networking unit $105_1$ to the second home networking unit $105_2$ is measured, and after this has been done, then the same link in the opposite direction is measured. Afterwards, features and statistics measured at the second home networking unit $105_2$ are transferred to the first home networking unit $105_1$ and stored. The data measured by the second home networking unit $105_2$ can also be transferred during a later measurement. The measurement data can also be sent to an additional data storing element (not shown), which may be in the home network, or external to it and accessible via the Internet, for example. After the measurements are done for one medium, e.g., power line communications, they are done for the remaining media, i.e., the operations described above are repeated until all desired network access technologies, e.g., WLAN or fibre, are measured.

In the sender's (home networking unit) signal generator, different parameters, such as frequency, transmission power, etc., can be changed. This allows the automatic measurement of several frequency bands, i.e., frequency dependent parameters can be measured to determine, e.g., the best frequency band if there are more than one. These parameters are then transmitted via a data link to the receiver (or vice versa). When sending data to the receiver, the sender's signal generator is tuned on different frequencies and transmission power (these are called characteristic sender points). For each of these characteristic sender points, different parameters are measured. These parameters may comprise one or more of: on the sender side, the output voltage; on the receiver side, the input voltage; on the receiver side, the throughput (data rate, data per time) for the received data; on the receiver side, the number of transmission errors (errors per time); on the sender side, the data round-trip time (run time of signal from the sender to the receiver and back); and on the receiver side, the phase difference (phase shifting).

Features in the physical layer and in the data layer are measured, and can be combined in order to obtain a feature vector comprising a vector of measured features. For each of the sender points, one or more measurements can be done. Some additional parameters from the data transmitting devices can also be considered, e.g., coupling transformers and capacitors. The measured values can be exchanged via the data link (on top of the electrical measurement) between the sender and the receiver. The measurements are done in two layers: the physical layer is used for measuring electrical features and the logical layer is used for measuring data features. The exchange of data between the units 105 is done in the data layer by using the physical layer. Thus, the data exchange can be done while performing measurements. With the exchange of data between the sender and the receiver, different measurement scenarios can be implemented. For example, the sender can inform the receiver about which parameters it has used, and the receiver can inform the sender about what it received. Then the sender can react to the receiver's answers, for example it can increase or decrease transmission power or change frequency, etc.

The system can also be synchronized. This means, in one embodiment, that the time base of both units 105 is synchronized to ensure measurement quality but also determine and/or record the state of each of the units 105. This is important, for example, if a measurement fails. Then the units have to find each other again and know in which state (see the flow chart of FIGS. 4a and 4b) they are to recover and continue with the measurements. If no signal (connectivity) is available, the receiver does not send data to the sender. With a predefined timeout, a no-connection can be detected. Thanks to the exchange of data between the sender and the receiver during measurements, it is possible to react instantly to the transmission characteristics, and a synchronization of the two devices can be obtained.

The measured values are stored in one of the home networking units $105_1$ and $105_2$ or transferred to another storage device or to a server in the Internet for later processing. To get a more accurate picture of the home network, the first home networking unit $105_1$ can also be placed at different positions such that all possible combinations of positions can be measured. The second home networking unit $105_2$ can also indicate the preferred link to the first home networking unit $105_1$ on an output device, e.g., a small display. This is advantageous if the user performing the measurements would like to have instant feedback regarding some specific measurements. Of course, the first home networking unit $105_1$ can also be arranged to show the results on a display. The first and second home networking units can actually be physically identical.

After all the measurements are performed, the measurement data can be transferred to a computer or computing device for calculation and/or presentation of the results. This may be one of the home networking unit $105_1$, $105_2$, or a dedicated processing element (not shown), which may be in the home network, or external to it and accessible via the Internet, for example, and have suitable logic, circuitry, interfaces, and/or code for implementing various aspects of the present invention, such as with respect to processing and/or post-processing use of measurement data. The processing and post-processing of the measurement data is explained later in more detail.

Figure 2:
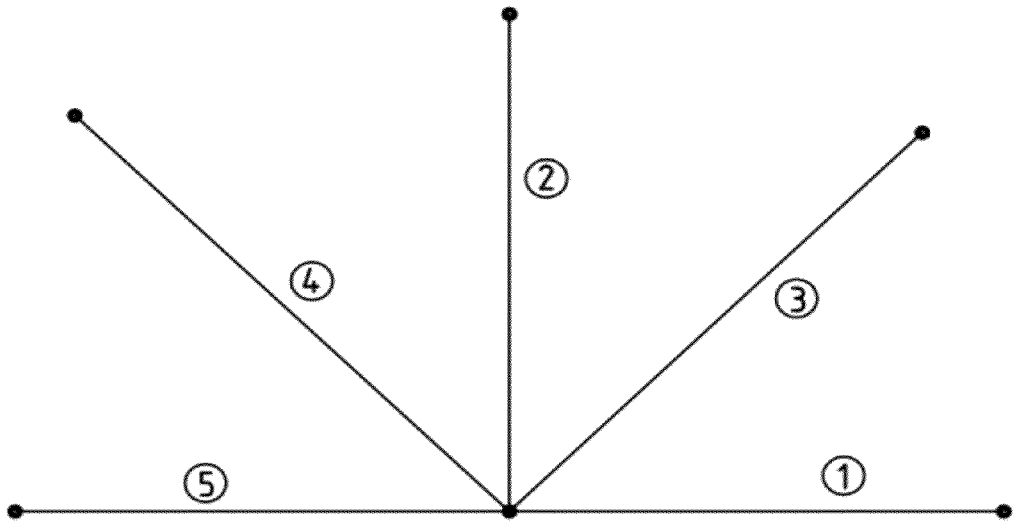
FIG. 2 illustrates an exemplary topology of measurements obtained when creating the home network map, in accordance with the embodiment of the invention.
Figure 3:
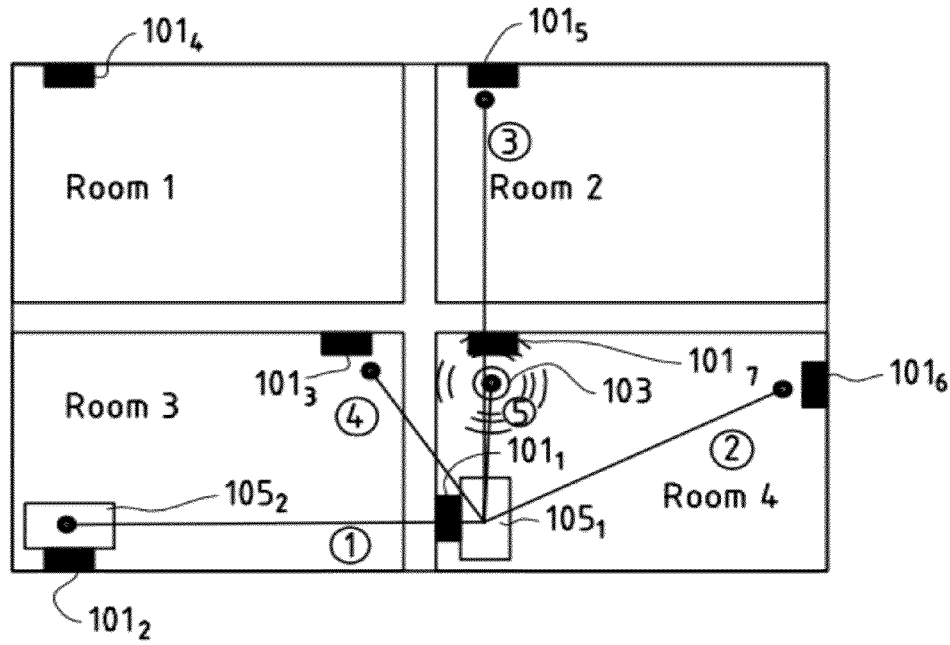
FIG. 3 is an exemplary home network map obtained after mapping the topology map, in accordance with the embodiment of the invention.

FIG. 2 shows an exemplary topology of measurements, which may be obtained based on measurement data generated in accordance with an embodiment of the present invention. This topology of measurements, however, is not yet mapped to the apartment layout. To get a more informative network map, the apartment layout can be mapped to the topology of measurements. Thus, the measurement points can be placed on a simplified room map. Based on the measured data, a network map is generated, the link data is shown in a detailed way and a recommendation of the best suited technology for a given position is provided automatically. This is schematically shown in FIG. 3, which illustrates an exemplary home network map obtained after mapping the topology of measurement map to a floor plan of the apartment shown in FIG. 1. The network map of FIG. 3 can also be obtained by the user indicating manually, when performing measurements, the relevant room number.

Figure 4A:
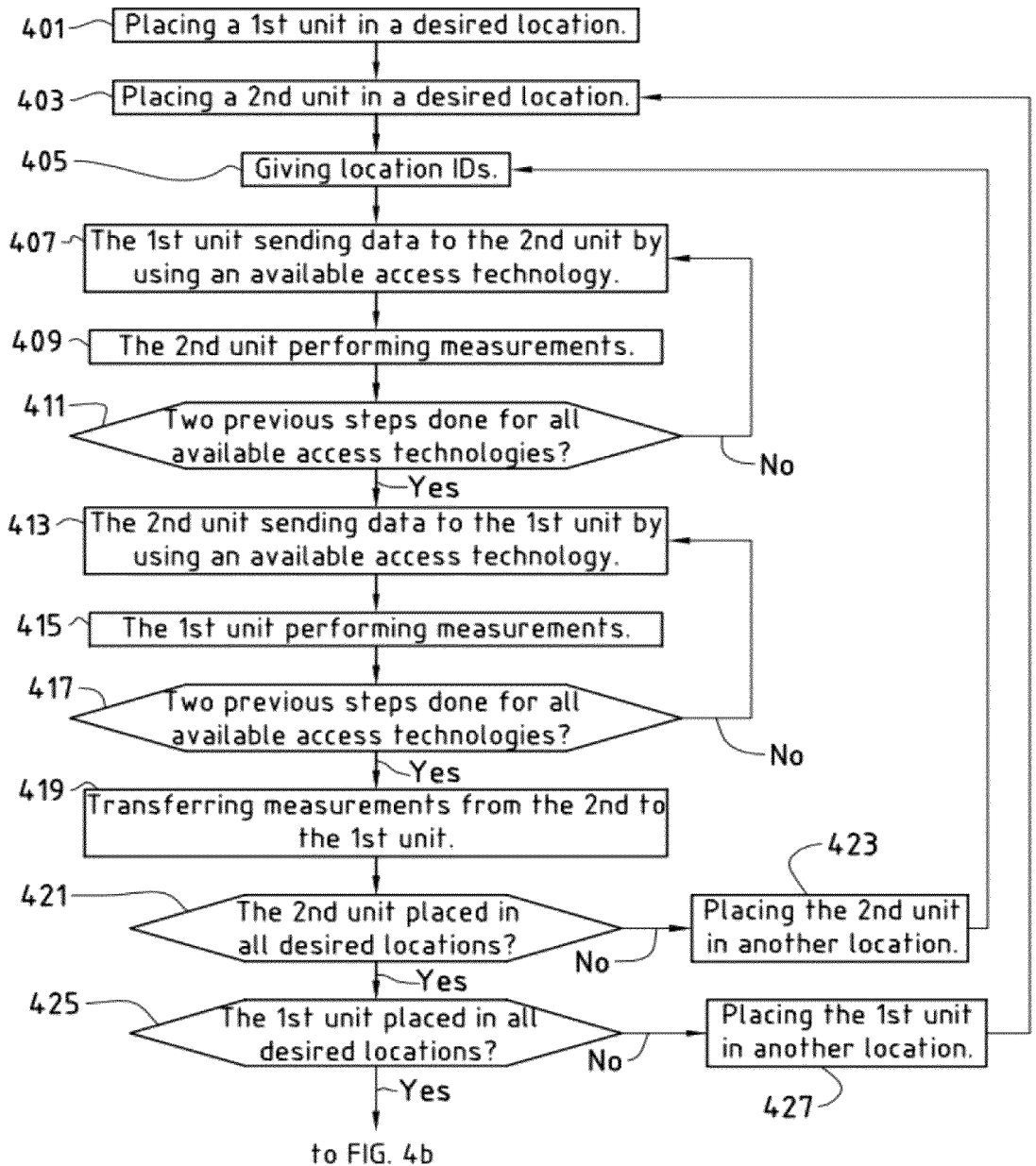
FIGS. 4a and 4b show a flow chart illustrating the method of generating the network map in accordance with an embodiment of the present invention.
Figure 4B:
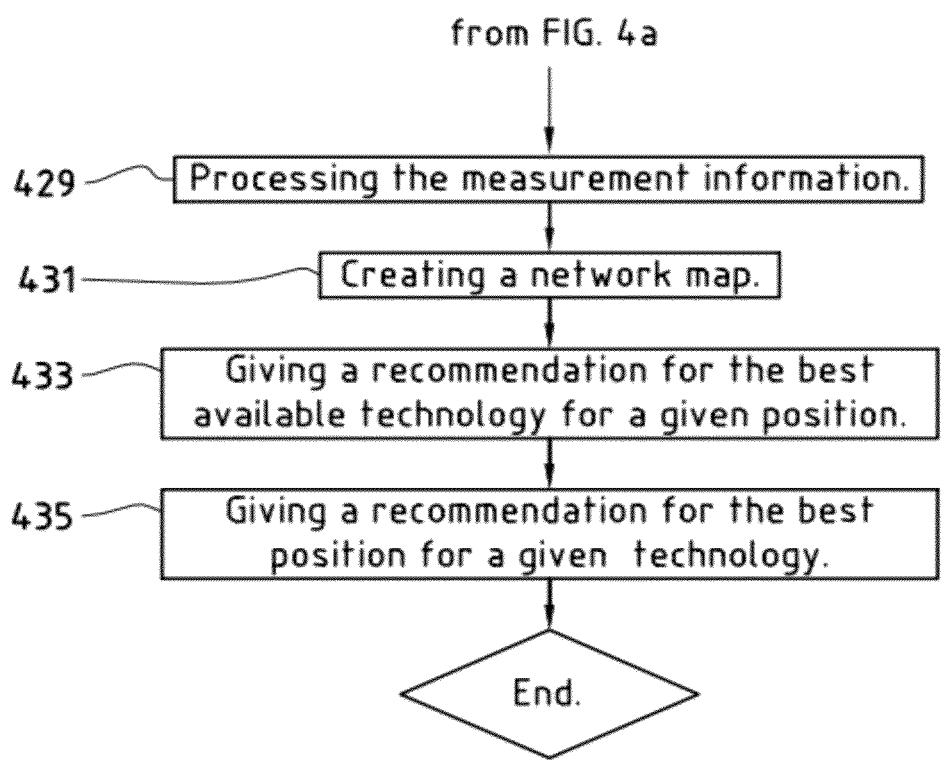

The flow chart of FIGS. 4a and 4b illustrates one example of the method of generating a home network map, such as in accordance with the embodiment described above. First in step 401 the user places the first home networking unit $105_1$ in a new location, and then in step 403 also places the second home networking unit $105_2$ in a new location. In step 405, location IDs are given unambiguously identifying the locations of these units 105. Each unit allocates a unique (within the measurement set) location ID to itself. Thus, the IDs can be given by each unit locally. Also in this step, the units 105 exchange the IDs so that the measurements can be synchronized and combined. In step 407 the first unit $105_1$ sends data to the second unit $105_2$ by using an available network access technology. In step 409 the second unit receives the data, processes it, and performs measurements. The steps 407 and 409 are generally performed concurrently, i.e., in parallel.

Thus, first measurement data is obtained. In step 411 it is determined whether the two previous steps have been completed for all available access technologies. If the response is negative, then the process continues in step 407.

If, on the other hand, the response is in the affirmative, then in step 413 the second unit $105_2$ sends data to the first unit $105_1$ by using an available access technology. Then, in step 415, the first unit $105_1$ processes the received data, and performs measurements on the received data. Thus, second measurement data is obtained. The steps 413 and 415 are generally performed in parallel. In step 417 it is determined whether the two previous steps have been done for all available access technologies. If the response is negative, then the process continues in step 413.

If, on the other hand, the response is in the affirmative, then in step 419 the first measurement data are transferred from the second unit $105_2$ to the first unit $105_1$. The data can also be stored on another device in the network, if connectivity exists. The measurements can be transferred using any available wireless or wired technologies. The most optimal access technology, in terms of performance, can be chosen for the transfer of the data. In step 421, it is determined whether the second unit $105_2$ has been placed in all desired locations. If the response is negative, then in step 423 the user places the second unit $105_2$ in another location. After this step the process continues in step 405.

If in step 421 the response is positive, then in step 425 it is determined whether the first unit $105_1$ has been placed in all desired locations. If the response is negative, then in step 427 the first unit $105_1$ is placed in another location, and after this the process continues in step 403. However, if in step 425 it is determined that the first unit $105_1$ has been placed in all desired locations, then in step 429, the first and second measurement data are processed. The processing may be performed by the first unit $105_1$, or by a dedicated server or processing element, which may be in the home network or external to it. Thus, this step may also comprise transferring the first and second measurement data from the first unit $105_1$ to the external server or processing element. Then based on the processed measurements, in step 431, a network map is created by the processor that processed the measurements. In this example, first a network topology map (as shown in FIG. 2) is obtained and then the actual network map is obtained by mapping the topology map to a given floor plan.

Different phases of power lines can also be determined. Here statistical likelihoods can be used for determining the different phases. Transferring data over from one phase to another is possible, but likely subject to interference. But in this case the data rate would drop dramatically. If now the position of the first unit $105_1$ is changed and at the same time the second unit $105_2$ is kept fixed, and if then high data rates are measured on the power line, it can be assumed with high probability that the phase in our network measurement has changed.

In step 433, a recommendation for the best available network access technology for a given position is given by the same processor, and in step 435, a recommendation for the best position for a given technology is given also by the same processor. The obtained network map and the results can be made available on a website for instance, so that they can be easily accessed by using a username and a password, for example. Then the process may terminate. It is to be noted that in the flow chart of FIG. 4, the order of the steps may be changed in various ways. For example and without limitation, the first measurement data can be transferred from the second unit $105_2$ to the first unit $105_1$ every time the measurements using one specific technology have been terminated.

According to a first aspect of the invention, a method is provided for generating a network map illustrating availability of network access technologies in various locations of the network as recited in claim 1. Thus, by use of the proposed method, a customer, a field service employee or also an electrician can get an automatic network and home installation map. This will help users determine either suitable technologies for given positions or suitable positions for given or new home networking equipment, such as computers and printers. With the proposed approach it is possible to generate a network map in an easy and automatic way by exploiting physical properties of the different transmission media. These properties can be, for example, signal attenuation, data rates, signal travel times between two devices and further features of the network. Furthermore, a network topology map (logical network map), which can be schematic, can be drawn in a short time for all available wireless and wired technologies. Especially for older buildings and their installations, it is difficult to obtain installation plans, or they rarely exist. If a floor plan is available, then this plan can be used and the network topology map can be mapped onto the floor plan. This may enable better planning for further extensions, and recommendations can be given to a customer.

The proposed method can be implemented in stand-alone measurement units, but partial measurements of a limited number of technologies can also be performed by every conventional communication device, such as a power line modem, WLAN unit (e.g., WiFi access point) or computer. The processing may be performed by the devices being used to generate the measurement, or by separate dedicated processing units.

One advantage is also that the solution is immediately applicable, and does not require changes in the network architecture. The proposed solution is also very user-friendly as there are no parameters that require configuration. The user only needs to initiate the process, e.g. by pressing a button when starting the process of obtaining the network map. The obtained network map is a so-called logical map, i.e., the obtained map shows how different measurement points are connected to each other and the quality of the available technologies.

According to a second aspect of the invention, a computer program product is provided for implementing the steps of the method according to the first aspect of the present invention when loaded and run on computer means of appropriate devices, such as network units.

According to a third aspect of the invention, one or more network units (e.g. units $105_1$ and $105_2$) may be operable to and/or arranged to support the present invention, and/or to implement various functions related thereto, which may comprise generating network maps illustrating availability of network access technologies in various locations of the networks.

The embodiment of the invention described above was in the context of a home network. However, the teachings of the present invention are not limited to this network. The teachings of the present invention are applicable to all networks, where it would be beneficial to create a network map. Examples of these networks are business and neighbourhood networks. These networks can be local area networks, but this is not necessarily the case.

The invention likewise relates to the home networking units 105 that are able to implement the method described above. Some of the method steps described above are performed by the first home networking unit $105_1$ and some by the second home networking unit $105_2$. As mentioned, the home networking units 105 can be specific measurement units or they can be normal end user network devices that are equipped with the measurement capability. The invention also relates to a system comprising the first and second network units and possibly also an external processor being operable and/or arranged to create the actual network map.

The invention likewise relates to a computer program product comprising instructions for implementing the steps of the method described above, when loaded and run on computer means of the network unit capable of implementing the method.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. In particular, when creating the network map, a learning process can be used for that purpose. In other words, already performed measurements can be advantageously used in further measurements to get a more detailed network map. Especially if two separate measurements look similar, it can be determined that the currently measured link has the same features as the previously measured link. Furthermore, it is also possible to perform measurements by using more than two measurement units. For example, it would be possible to have one measurement unit at each position that should be measured (e.g. 5-10 measurement units). By pressing one button all the measurements between all the required measurement units are done automatically. Each measurement would take place as described for two units but the measurements will be done automatically one after the other. Or alternatively each measurement unit could perform measurements concurrently.

In the claims, the word "comprising" does not exclude other units or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
receiving by a processing unit, a first measurement data transferred from a second network unit, the location of which is identified by a second identifier, wherein:
the first measurement data relates to first data received by the second network unit from a first network unit, the location of which is identified by a first identifier; and
the first network unit sends the first data to the second network unit, while the second network unit is located in at least two different locations; and
generating by the processing unit a network map based on the first measurement data, the first identifier and the second identifier, wherein the network map illustrates availability of network access technologies in various locations of a network comprising the first network unit and the second network unit.

2. The method according to claim 1, wherein the processing unit is the first network unit.

3. The method according to claim 1, wherein the first data is sent by the first network unit using at least two different network access technologies.

4. The method according to claim 1, wherein the first measurement data is obtained by processing the first data.

5. The method according to claim 1, comprising generating a recommendation for a network access technology for a home networking unit in a given location and/or a recommendation for a position for a home networking unit configured to use a specific network access technology.

6. The method according to claim 1, wherein the first network unit is placed in at least one other location, the first network unit then sending the first data from this new location to the second network unit.

7. The method according to claim 1, wherein in at least certain locations the first network unit and/or the second network unit is/are plugged into a connection point of a wired communication network.

8. The method according to claim 1, comprising receiving by the processing unit before generating the network map, from the first network unit a second measurement data for use in generating the network map.

9. The method according to claim 8, wherein the first network unit receives third data from the second network unit, whereby the third data is received over at least two different network access technologies and from at least two different locations for the second network unit, and the first network unit processes the third data to obtain the second measurement data.

10. The method according to claim 1 or 8, wherein the first and/or second measurement data comprise one or more of the following values: attenuation between the first and second network units, throughput, distance between the first and second network units, data round-trip time, data receiving statistics, bit rate sweep statistics, packet size sweep statistics, data loss statistics and retransmission information.

11. The method according to claim 1 or 8, wherein when obtaining the first and/or second measurement data, a learning process is used in which the previously processed data is taken into account when processing the current data.

12. The method according to claim 1, wherein the first network unit and the second network unit exchange the first and second identifiers.

13. The method according to claim 1, wherein the network map is obtained by mapping a network topology map with a given floor plan.

14. The method according to claim 1, wherein the first measurement data is transferred to the processing unit by the second network unit transferring the first measurement data to the first network unit which transfers the first measurement data to the processing unit.

15. The method according to claim 1, wherein a specific second network unit is used for each location and wherein the first measurement data is obtained by the specific second network units processing, one after the other or simultaneously, the first data.

16. A system, comprising:
a network unit for use during generation of a network map illustrating availability of network access technologies in various locations of a network, the location of the network unit being identified by a first identifier, the network unit being operable to:
  send first data to another network unit, the location of which is identified by a second identifier, while the other network unit is located in at least two different locations;
  receive from the other network unit second data comprising first measurement data relating to the sent first data; and
  process the first measurement data to obtain the network map based on the first measurement data, the first identifier and the second identifier.

17. The system according to claim 16, wherein the measurement data processing comprises transferring the measurement data to an external device for generating the network map.

18. The system according to claim 16, wherein the network unit is operable to send the first data using at least two different network access technologies.

19. The system according to claim 16, wherein the network unit is operable to exchange the first and second identifiers with the other network unit.

20. The system according to claim 16, wherein the network unit is operable to:
  receive third data from the other network unit, whereby the third data is received over at least two different network access technologies and from at least two different locations for the other network unit; and
  process the third data to obtain the second measurement data.

21. A system, comprising:
a processing unit that is used in generating a network map illustrating availability of network access technologies in various locations of a network, the processing unit being operable to:
  receive a first measurement data transferred from a second network unit, the location of which is identified by a second identifier, wherein:
    the first measurement data relates to first data received by the second network unit from a first network unit, the location of which is identified by a first identifier; and
    the first data being sent by the first network unit to the second network unit, while the second network unit is located in at least two different locations; and
  generate the network map based on the first measurement data, the first identifier and the second identifier.

22. The system according to claim 21, wherein the processing unit is operable to generate a recommendation for an optimal network access technology for a home networking unit in a given location and/or a recommendation for an optimal position for a home networking unit configured to use a specific network access technology.

23. The system according to claim 21, wherein the processing unit is operable to receive before generating the network map, from the first network unit a second measurement data for use in generating the network map.

24. The system according to claim 21 or 23, wherein the first and/or second measurement data comprise one or more of the following values: attenuation between the first and second network units, throughput, distance between the first and second network units, data round-trip time, data receiving statistics, bit rate sweep statistics, packet size sweep statistics, data loss statistics and retransmission information.

25. The system according to claim 21 or 23, wherein when obtaining the first and/or second measurement data, a learning process is used in which the previously processed data is taken into account when processing the current data.

26. The system according to claim 21, wherein the processing unit is operable to obtain the network map based on mapping of a network topology map with a given floor plan.

27. A system for generating a network map illustrating availability of network access technologies in various locations of the network, the system comprising:
a first network unit, the location of which is identified by a first identifier, a second network unit, the location of which is identified by a second identifier, and a third network unit, wherein:
  the first network unit is operable to send first data to the second network unit, whereby the first data is sent to at least two different locations for the second network unit;
  the second network unit is operable to receive the first data and to process the first data in order to generate first measurement data, relating to the sent first data;
  the second network unit is operable to transfer the first measurement data to the third network unit; and
  the third network unit is operable to receive the first measurement data and to process the first measurement data to obtain the network map, based on the measurement data, the first identifier and the second identifier.

* * * * *